US010010884B1

(12) United States Patent
Flory et al.

(10) Patent No.: US 10,010,884 B1
(45) Date of Patent: Jul. 3, 2018

(54) DROPLET ACTUATION ENHANCEMENT USING OSCILLATORY SLIDING MOTION BETWEEN SUBSTRATES IN MICROFLUIDIC DEVICES

(71) Applicant: Agilent Technologies, Inc., Loveland, CO (US)

(72) Inventors: Curt A. Flory, Los Altos, CA (US); Arthur Schleifer, Portola Valley, CA (US); Gershon Perelman, Cupertino, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 898 days.

(21) Appl. No.: 14/155,266

(22) Filed: Jan. 14, 2014

(51) Int. Cl.
*B01D 57/02* (2006.01)
*B01L 3/00* (2006.01)

(52) U.S. Cl.
CPC .............................. *B01L 3/502792* (2013.01)

(58) Field of Classification Search
CPC ................ G01N 13/00; G01N 2013/00; B01L 2400/0427; B01L 3/502; B01L 3/502792; F15D 1/00
See application file for complete search history.

(56) References Cited

U.S. PATENT DOCUMENTS 6,911,132 B2 6/2005 Pamula et al.
6,989,234 B2 1/2006 Kolar et al.
7,329,545 B2 2/2008 Pamula et al.
7,569,129 B2 8/2009 Pamula et al.
8,367,370 B2 2/2013 Wheeler et al.
2007/0037294 A1* 2/2007 Pamula .............. B01F 13/0071 436/180
2008/0073216 A1* 3/2008 Sugahara .............. H02N 1/004 204/650
2009/0203063 A1* 8/2009 Wheeler ............ B01F 13/0071 435/29
2011/0247938 A1 10/2011 Wang et al.
2012/0044299 A1 2/2012 Winger (Continued)

OTHER PUBLICATIONS

Chabreyrie, et al. "Using Resonances to Control Chaotic Mixing within a Translating and Rotating Droplet", Communications in Nonlinear Science and Numerical Simulation, vol. 15, No. 8, p. 2124-2132, Aug. 2010.

(Continued)

*Primary Examiner* — Gurpreet Kaur

(57) ABSTRACT

A droplet-based microfluidic device having a first confining plate, a second confining plate, and an actuator. Each confining plate includes a respective substrate and hydrophobic layer having a planar major surface. The first confining plate additionally includes a common electrode between its hydrophobic layer and substrate. The second confining plate includes an electrode array between its hydrophobic layer and substrate. The confining plates are disposed opposite one another with their major surfaces separated from one another by a gap. The actuator is to impart oscillatory sliding motion between the confining plates in a direction principally parallel to the major surfaces. The oscillatory sliding motion effectively allows voltages applied between the common electrode and the electrodes of the electrode array to move a microfluidic droplet located in the gap across the major surfaces without sticking.

17 Claims, 4 Drawing Sheets

(56) References Cited

U.S. PATENT DOCUMENTS

| | | | |
|---|---|---|---|
| 2012/0298205 | A1 | 11/2012 | Schertzer et al. |
| 2013/0026040 | A1 | 1/2013 | Cheng et al. |
| 2013/0068622 | A1 | 3/2013 | Schertzer et al. |
| 2013/0134039 | A1* | 5/2013 | Bjornson .......... B01L 3/502715 204/451 |
| 2013/0277218 | A1 | 10/2013 | Mudrik et al. |

OTHER PUBLICATIONS

Yafia, et al. "High precision control of gap height for enhancing principal digital microfluidics operations", Sensors and Actuators, B: Chemical, vol. 186, p. 343-352, 2013.
Li, et al. "Enhanced micro-droplet splitting, concentration, sensing and ejection by integrating ElectroWetting-On-Dielectrics and Surface Acoustic Wave technologies", 2011 16th International Solid-State Sensors, Actuators and Microsystems Conference, Transducers'11, p. 2936-2939.

* cited by examiner

DROPLET ACTUATION ENHANCEMENT USING OSCILLATORY SLIDING MOTION BETWEEN SUBSTRATES IN MICROFLUIDIC DEVICES

BACKGROUND

Microfluidics is a powerful tool for chemical and biological manipulations and assays. Benefits of microfluidics include reduced reagent consumption and analysis time, as well as the ability to integrate multiple functions on a single device. Two basic families of microfluidic devices exist. The first family consists of channel microfluidic devices, in which fluids are manipulated as continuous flows in micron-dimension channels. The second family consists of droplet-based microfluidic (DMF) devices, in which a liquid is transported in the form of droplets across a planar surface or between two parallel surfaces, rather than as a continuous stream in a channel. In DMF devices, the sequence of droplet movements can be programmable, allowing the same device to be used to perform multiple different assays.

In DMF devices, voltages are sequentially applied to an electrode array to move a droplet across a planar surface to achieve such functions as droplet dispensing, droplet motion, droplet splitting, and droplet merging. However, microscopic and macroscopic irregularities in the planar surface and/or chemical residues left on the planar surface from the prior movement of the droplet or other droplets in the DMF device generate a hydrodynamic drag force that cannot be overcome by the motive force generated by an applied voltage less than the breakdown voltage between the electrodes. Conventional DMF devices overcome this problem by sandwiching the droplet between two plates having planar surfaces, and filling the gap between the surfaces of the plates with a background matrix of oil that reduces the hydrodynamic drag between the droplet and the surfaces of the plates. However, the use of an oil background matrix severely limits the usefulness and flexibility of the DMF device. For example, the oil forms an impenetrable barrier between the droplet and the substrate surface, making it impossible to perform surface chemistry. Moreover, the requirement that the droplets remain immiscible in the oil imposes a limitation on the chemical composition of the droplet.

Accordingly, what is needed is a way to overcome hydrodynamic drag in a DMF device without the limitations resulting from the use of a background matrix of oil.

DETAILED DESCRIPTION

Figure 1A:
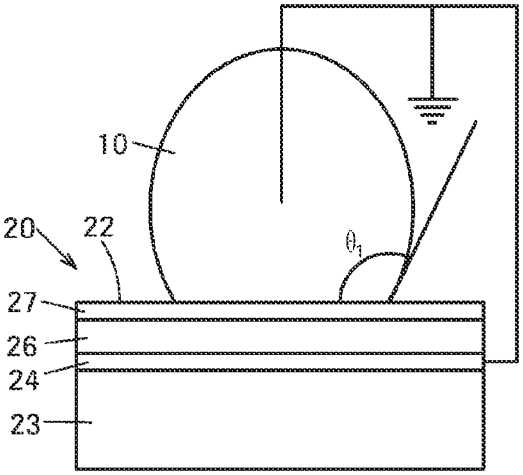
FIGS. 1A and 1B are schematic side views showing a droplet of a liquid on the hydrophobic planar major surface of a confining plate.
Figure 1B:
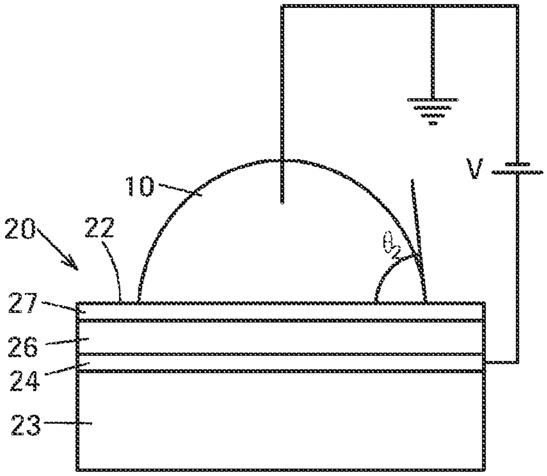

In a DMF device, a droplet is moved across a planar surface by exploiting a physical mechanism called Electrowetting on Dielectric, or EWOD. FIGS. 1A and 1B are schematic side views showing an example of the EWOD mechanism. FIGS. 1A and 1B are schematic side views showing a droplet 10 of a liquid on the hydrophobic planar major surface 22 of a confining plate 20. In the example shown, confining plate 20 includes a substrate 23, an electrode 24 on the major surface of substrate 23, a dielectric layer 26 on the major surface of electrode 24, and a hydrophobic layer 27 on the major surface of dielectric layer 26. In this example, major surface 22 is the major surface of hydrophobic layer 27. In another example, the material of hydrophobic layer 27 has acceptable dielectric properties, and confining plate 20 lacks a dielectric layer separate from hydrophobic layer 27. In the example shown in FIG. 1A, droplet 10 and electrode 24 are grounded, and the angle of contact between droplet 10 and major surface 22 is $\theta_1$. In the example shown in FIG. 1B, a voltage V in is applied between electrode 24 and grounded droplet 10, which causes the angle of contact between droplet 10 and major surface 22 to change to $\theta_2$, less than $\theta_1$.

Figure 2A:
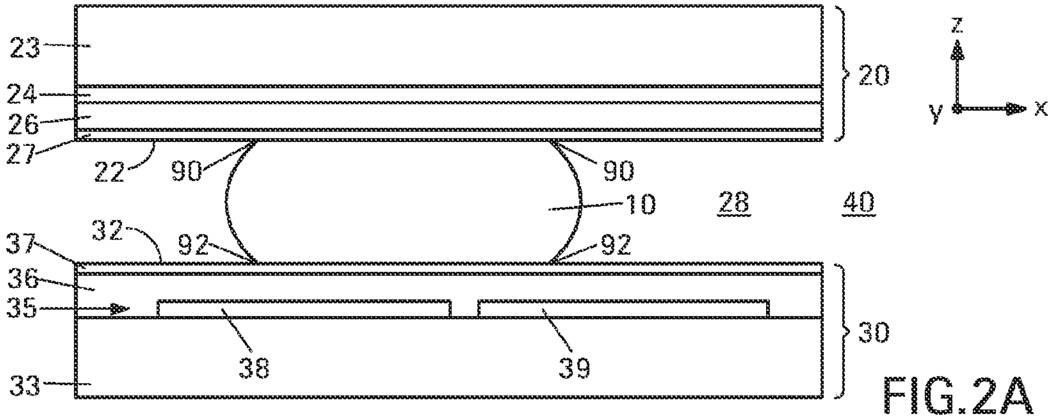
FIGS. 2A and 2B are schematic side views showing a highly simplified example of a DMF device.
Figure 2B:
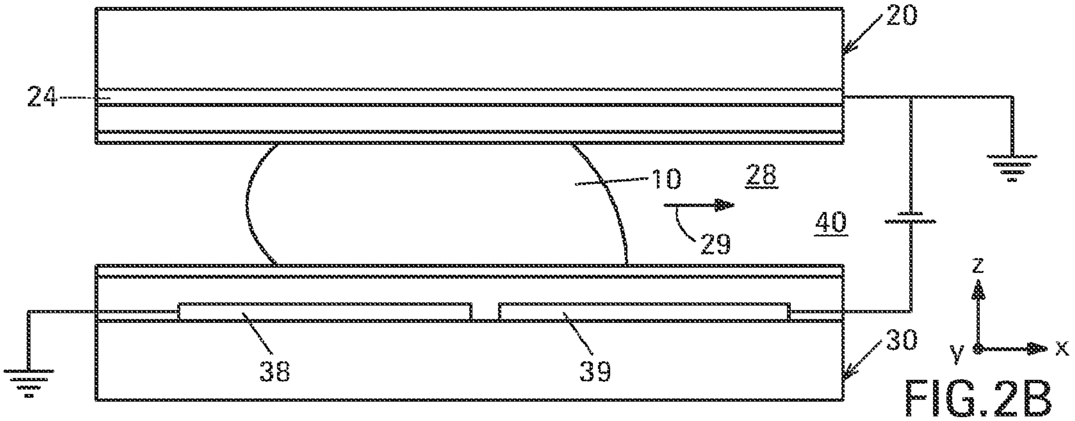

FIGS. 2A and 2B are schematic side views showing a highly simplified example 40 of a DMF device configured to move a droplet 10 of liquid across a major surface using the EWOD mechanism. DMF device 40 includes above-described confining plate 20 and a confining plate 30 having planar and hydrophobic major surface 32. Confining plate 20 will sometimes be referred to as first confining plate 20, and confining plate 30 will sometimes be referred to as a second confining plate 30. In the example shown, confining plate 30 includes a substrate 33, an array 35 of electrodes on the major surface of substrate 33, a dielectric layer 36 covering electrode array 35, and a hydrophobic layer 37 on the major surface of dielectric layer 36. In the example shown, the major surface of hydrophobic layer 37 provides the major surface 32 of confining plate 30. In an example in which the material of hydrophobic layer 37 has acceptable dielectric properties, confining plate 30 lacks a dielectric layer separate from hydrophobic layer 37.

In DMF device 40, confining plate 20 is inverted and is disposed opposite confining plate 30 with major surface 22 opposite and parallel to major surface 32 and separated from major surface 32 by a gap 28. FIGS. 2A and 2B also show a liquid droplet 10 located in gap 28 and contacting both major surfaces 22 and 32.

In following description, a Cartesian coordinate system is used to define directions. In the coordinate system, major surface 32 defines an x-y plane, and major surface 22 is offset from major surface 32 in a z-direction, orthogonal to the x-y plane.

In the example in FIGS. 2A and 2B, electrode array 35 includes electrode 38 and electrode 39 offset from electrode 38 in the x-direction. Drive circuits (not shown) are provided to apply a drive voltage between electrode 24 of confining plate 20 and electrodes 38, 39 of confining plate 30 individually. In an example, the drive circuits (not shown) are fabricated in and on substrate 33. In another example, the drive circuits are external to substrate 33. Sequentially activating electrodes 38 and 39 by momentarily applying a drive voltage between electrode 24 and electrode 38, and then momentarily applying the drive voltage between electrode 24 and electrode 39, as shown in FIG. 2B, applies a motive force to droplet 10 through the EWOD mechanism. The motive force tends to move droplet 10 in the direction indicated by arrow 29.

Droplet 10 is confined between parallel major surfaces 22, 32 that are separated by gap 28 whose width is substantially smaller than the diameter of droplet 10. In an example, droplet 10 has a diameter of about 1 mm, and the gap 28 between major surfaces 22, 32 has a width (dimension in the z-direction) of about 1⁄10 of the diameter of the droplet, e.g., about 100 μm. Droplet 10 contacts major surface 22 at a triple-phase contact line 90, and contacts major surface 32 at a triple-phase contact line 92. During the EWOD actuation process just described, droplet 10 is subject to a drag force at the droplet-surface interface. One exemplary origin of the drag force is the (microscopic) inhomogeneity structure of major surfaces 22, 32. The drag force resulting from the inhomogeneity of the major surfaces causes localized "sticking" of the contact lines 90, 92 of the droplet with the respective major surface 22, 32 during motion of droplet 10. An additional contributor to the drag force is major surface 32 being not perfectly planar due to the presence of electrodes 38, 39 (and respective vias (not shown) extending through substrate 33 to the electrodes) beneath the major surface. The resulting gradients on major surface 32 impede the motion of contact lines 90, 92. A further contributor to the drag force is the "snail trail" left by droplet 10 or another droplet as the respective droplet moves across major surfaces 22, 32. The snail trail impedes the motion of a droplet whose path across major surfaces 22, 32 crosses it. A total drag force greater than the motive force generated by the EWOD mechanism will prevent the motive force from moving the droplet, and the droplet will remain stuck at its current location.

It has been proposed that mechanically shaking an entire DMF device can supply kinetic energy to droplet 10, causing a rapid oscillatory movement of the contact line 90, 92 of the droplet, and that such movement would effectively overcome the drag force to which the droplet is subject. This is analogous to using mechanical shaking to induce a stationary sessile droplet on an inclined plane to begin sliding down the inclined plane. However, this approach becomes increasingly less effective as the droplet size is decreased, as the effect depends upon the inertia of the droplet for its actuation. The inertia of the droplet scales down with the droplet mass (proportional to $R^3$, where R is the radius of the droplet) while the drag force only scales down with the length of the triple-phase contact line (proportional to R). Consequently, mechanical shaking becomes less effective in overcoming the drag force as the droplet volume is reduced to the sub microliter volumes typical of the droplets in contemporary DMF devices.

As the droplet size is decreased, mechanical shaking becomes even less effective as a means for overcoming the drag forces in a DMF device than in the sessile droplet on the inclined plane for two main reasons. First, the DMF device constrains and contacts the droplet using two surfaces rather than only one. This doubles the drag force. Secondly, at smaller droplet sizes, the droplet volume is reduced substantially below the $R^3$ scaling described above because the height of the droplet is truncated by contact with the confining plates ($h \ll R$, typically $h < R/5$, where h and R are the height and the radius, respectively, of the droplet). As a result, mechanically shaking the entire DMF device (which causes major surfaces 22, 32 to move in concert in the ±z-direction) would be ineffective at overcoming the drag force by forcing the contact lines to move and overcome the various barriers to movement.

DMF devices as disclosed herein effectively use mechanical energy to lower the barriers to movement of the contact lines of very small droplets, but do not rely on inertial effects. Surface tension dynamics typically dominate at the scale of the droplet dimensions typically found in DMF devices. Accordingly, the DMF devices disclosed herein use mechanical energy that relies upon surface tension dynamics to overcome the barriers to movement of the contact lines of very small droplets. Specifically, the DMF devices disclosed herein include an actuator that imparts an oscillatory motion between the two confining plates that contact the droplet of the DMF device. The oscillatory motion is in a direction principally parallel to the major surfaces, i.e., in the x-y plane. Oscillatory motion between confining plates 120, 130 in a directional principally parallel to major surfaces 122, 132 and, hence, principally parallel to the x-y plane, will be referred to herein as oscillatory sliding motion.

Figure 3:
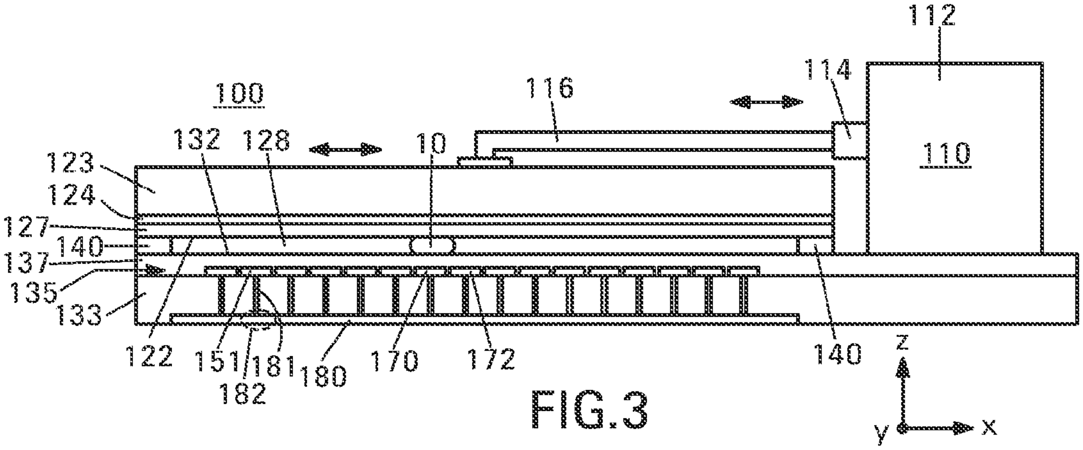
FIG. 3 is a schematic side view showing an example of a DMF device in accordance with this disclosure.

FIG. 3 is a schematic side view showing an example 100 of a DMF device in accordance with this disclosure. DMF device 100 includes a first confining plate 120, a second confining plate 130, and an actuator 110.

First confining plate 120 includes a substrate 123, a hydrophobic layer 127 having a hydrophobic and planar major surface 122, and a common electrode 124 between hydrophobic layer 127 and substrate 123. Second confining plate 130 includes a substrate 133, a hydrophobic layer 137 having a hydrophobic and planar major surface 132, and an electrode array 135 between hydrophobic layer 137 and substrate 133. First confining plate 120 and second confining plate 130 are disposed opposite one another with major surface 122 and major surface 132 opposite one another, parallel to one another, and separated from one another by a gap 128. Small deviations from parallel are permissible. Actuator 110 is coupled to confining plates 120, 130 to impart oscillatory sliding motion between the confining plates, i.e., oscillatory motion in a direction principally parallel to major surfaces 122, 132.

In the example shown, hydrophobic layer 127 covers common electrode 124. In another example, (not shown) the material of hydrophobic layer 127 has inadequate dielectric properties, and a separate dielectric layer (not shown), similar to dielectric layer 26 described above with reference to FIG. 2A, is interposed between common electrode 124 and hydrophobic layer 127. In the example shown, hydrophobic layer 137 covers electrode array 135. In another example, the material of hydrophobic layer 137 has inadequate dielectric properties, and a separate dielectric layer (not shown), similar to dielectric layer 36 described above with reference to FIG. 2A, is interposed between electrode array 135 and hydrophobic layer 137. In the example shown, in the x-y plane, common electrode 124 is at least co-extensive with electrode array 135. In some examples, common electrode 124 is divided into sub electrodes, each of which is coextensive with a respective portion of electrode array 135.

In the example shown, DMF device 100 additionally includes an annular, laterally-compliant spacer 140 that couples first confining plate 120 and second confining plate 130 in a way that defines gap 128 between the major surface 122 of the first confining plate 120 and the major surface 132 of second confining plate 130. Laterally-compliant spacer 140 additionally allows first confining plate 120 and second confining plate 130 to slide relative to one another, i.e., to move relative to one another in a direction principally in the x-y plane. In an example, laterally-compliant spacer 140 has a substantially larger compliance in the x- and y-directions than in the z-direction. In another example, laterally-compliant spacer 140 has a substantially larger compliance in the x-direction than in the y- and z-directions. In another example, laterally-compliant spacer 140 has substantially equal compliances in the x, y, and z-directions. In an example, a relatively rigid annular gasket (not shown) that can accurately define the width of gap 128 between major surface 122 and major surface 132 under light compression is used as laterally-compliant spacer 140. The gasket is of a material that accurately defines the width of gap 128 between major surfaces 122, 132 and allows confining plates 120, 130 to slide relative to one another. An exemplary gasket material is plastic shim stock, cut to have a perimeter that encloses electrode array 135. Confining plates 120, 130 and the annular gasket used as spacer 140 fully enclose gap 128, which allows a relatively high humidity to be maintained within the gap. The high humidity reduces evaporation of droplet 10.

Other ways of disposing first confining plate 120 and second confining plate 130 with major surfaces 122, 132 opposite one another, parallel to one another, and separated from one another by gap 128 and that allows first confining plate 120 and second confining plate 130 to slide relative to one another are known and may be used. In an example, respective mountings are used to mount first confining plate 120 and second confining plate 130 independently to a common armature (not shown) such that major surfaces 122, 132 are opposite one another, parallel to one another, and separated from one another by gap 128. The mounting of at least one of confining plates 120, 130 is laterally compliant to allow the confining plate mounted by the laterally-compliant mounting to slide relative to the other confining plate.

Actuator 110 imparts oscillatory sliding motion between confining plates 120, 130, i.e., oscillatory motion in a direction principally parallel to major surfaces 122, 132. In the example shown, actuator 110 includes a stator 112 and a translator 114, and stator 112 is mounted on a portion of second confining plate 130. Actuator 110 moves translator 114 with a reciprocating motion in the ±x-direction relative to stator 112. A connecting rod 116 couples the reciprocating motion of translator 114 to the surface of first confining plate 120 opposite major surface 122 to move first confining plate 120 relative to second confining plate 130. Other ways of coupling actuator 110 to first confining plate to impart oscillatory sliding motion between the confining plates are known and may be used.

In the example shown, the oscillatory sliding motion imparted by actuator 110, i.e., oscillatory motion in a direction principally parallel to major surfaces 122, 132, is in the ±x-direction. In another example, the oscillatory sliding motion imparted by actuator 110 is in the ±y-direction. In other examples, the oscillatory sliding motion imparted by actuator 110 is in a direction having components in the x-direction and the y-direction. In other examples, the oscillatory sliding motion imparted by actuator 110 is circular or elliptical.

Oscillatory sliding motion imparted by actuator 110 between confining plates 120, 130 is described above as being in a direction principally parallel to major surfaces 122, 132. Thus, the above-described examples of oscillatory sliding motion may include a small component in the z-direction, orthogonal to the major surfaces. In an example, the peak-to-peak amplitude of the z-direction component is less than one fourth of that of the component in the x-y plane. In another example, the peak-to-peak amplitude of z-direction component is less than one tenth of that of the component in the x-y plane.

In an example, a loudspeaker driver (not shown) was adapted for use as actuator 110. The magnet of the loudspeaker driver constituted stator 112, and the voice coil assembly of the loudspeaker driver constituted translator 114. The voice coil assembly was connected to the end of connecting rod 116, remote from first confining plate 120, and was fed with an alternating current from a power amplifier driven by an audio oscillator. Other types of electromagnetic linear motor may also be used. In another example, an electric toothbrush mechanism (not shown) having a reciprocating toothbrush driver was adapted for use as actuator 110. The body of the electric toothbrush constituted stator 112, and the toothbrush driver constituted translator 114 and was connected to the end of connecting rod 116 remote from first confining plate 120. In another example, a small electric motor is fitted with a cam (not shown). A spring is connected to connecting rod 116 to maintain contact between the end of the connecting rod remote from first confining plate 120 and the cam. In another example, an electric motor is mounted on the major surface of confining plate 120 remote from major surface 122 with its output shaft orthogonal to major surface 122, and an eccentric weight is mounted on the output shaft. Electric current supplied to the motor causes the output shaft to rotate and impart circular oscillatory sliding motion on confining plate 120. Alternatively, the stator of the motor with the eccentric weight on its output shaft is mounted on the major surface 132 of confining plate 130 with laterally-compliant mounts, and connecting rod 116 is connected to the stator to couple the circular oscillatory sliding motion of the stator to confining plate 120. In another example, one end of a piezoelectric actuator (not shown) is mounted on second confining plate 130, the end of connecting rod 116 remote from first confining plate 120 is coupled to the other end of the piezoelectric actuator, and the piezoelectric actuator is driven by a suitable driver in response to an audio oscillator. Other ways of imparting oscillatory sliding motion between confining plates 120, 130 are known and may be used. Moreover, in the above descriptions, first confining plate 120 and second confining plate 130 may be interchanged. Moreover, in the above descriptions, actuator 110 may be configured to drive first confining plate 120 and second confining plate 130 simultaneously in opposite directions to reduce the transmission of vibration from DMF device 100 to the environment.

In the example shown, electrode array 135 is a two-dimensional array of electrodes, an exemplary one of which is shown at 151. Reference numeral 151 will additionally be used to refer to the electrodes of electrode array 135 collectively. The rows of electrodes 151 define the x-direction and the columns of electrodes 151 define the y-direction, orthogonal to the x-direction in the plane of the major surface 132 of confining plate 130 in the above-described Cartesian coordinate system.

In the example shown, DMF device 100 additionally includes a driver circuit 180 constructed in and/or on the major surface of substrate 133 remote from hydrophobic layer 137. A respective via extends through substrate 133 from a respective portion of driver circuit 180 to each electrode of electrode array 135. An exemplary via 181 is shown extending from a portion 182 of driver circuit 180 to exemplary electrode 151. Circuits capable of applying a defined drive voltage to one or more electrodes whose locations in electrode array 135 are defined by address signals are known in the art and may be used. Processes for fabricating such circuits in and/or on a substrate are known in the art and may be used. In other examples, driver circuit 180 is mounted on the major surface of substrate 133 remote from hydrophobic layer 137, or is mounted elsewhere on confining plate 130 and is connected to electrode array 135 by an array of conductors. In other examples, driver circuit 180 is external to DMF device 100 and is connected to electrode array 135 by an array of conductors.

FIG. 3 additionally shows exemplary droplet 10 in the gap 128 located between the major surface 122 of first confining plate 120 and the major surface to 132 of second confining plate 130, and in contact with both major surfaces.

In an example, substrates 123, 133 are implemented using respective borosilicate glass wafers, the material of common electrode 124 and the electrodes of electrode array 135 is gold, the material of hydrophobic layers 127, 137 is polytetrafluorethylene (PTFE) or an amorphous fluoropolymer sold by Bellex International Corporation, Wilmington, Del., under the trademark CYTOP®. The material of vias 181 is copper. In an embodiment that includes a respective dielectric layer between hydrophobic layer 127 and common electrode 124 and/or between hydrophobic layer 137 and electrode array 135, the material of the dielectric layer is silicon dioxide.

Figure 4A:
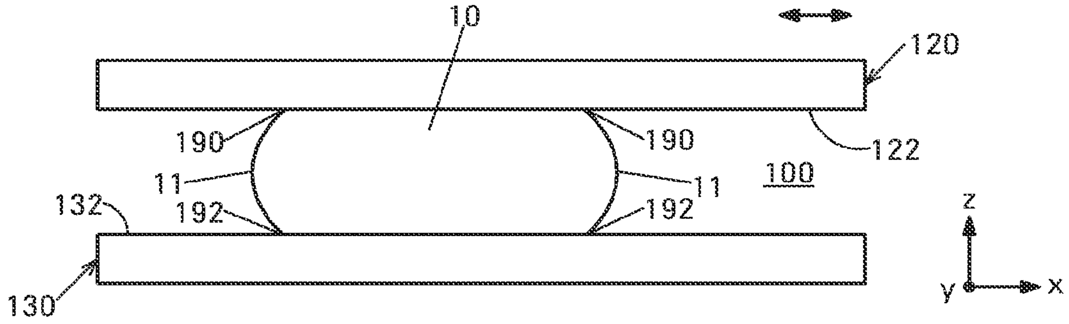
FIGS. 4A and 4B are schematic side views showing a portion of the DMF device shown in FIG. 3 in which a droplet is located.
Figure 4B:
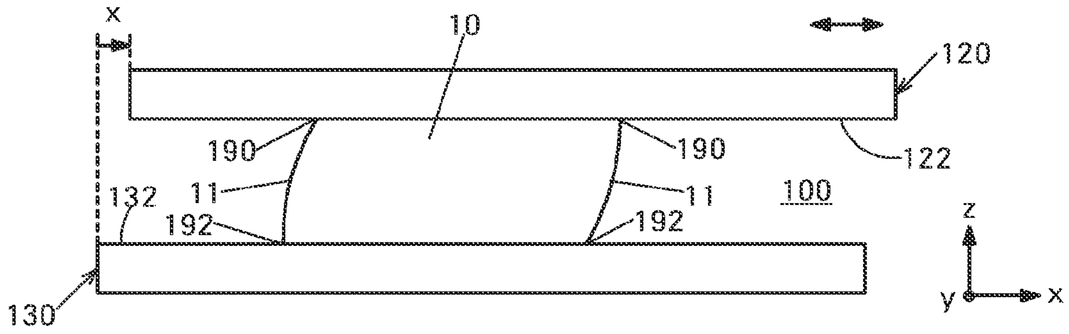

FIGS. 4A and 4B are schematic side views showing a portion of DMF device 100 in which droplet 10 is located in an example in which the oscillatory sliding motion between first confining plate 120 and second confining plate 130 is in the x-direction, and in which first confining plate 120 moves relative to second confining plate 130. Droplet 10 contacts major surface 122 at a triple-phase contact line 190, and contacts major surface 132 at a triple-phase contact line 192. The figures show DMF device 100 and droplet 10 at respective points in the cycle of the oscillatory sliding motion between the first confining plate 120 and second confining plate 130. FIG. 4A shows DMF device 100 at the beginning of the cycle of the oscillatory sliding motion where first confining plate 120 is not shifted in the x-direction relative to second confining plate 130, and, consequently, droplet 10 is undistorted. At this point in the cycle, the length of the side surface 11 of droplet 10, i.e., the distance along side surface 11 between contact line 190 and contact line 192, is a minimum.

FIG. 4B shows DMF device 100 at a point in the cycle of the oscillatory sliding motion where first confining plate 120 has been shifted a distance x in the x-direction relative to second confining plate 130. In the example shown, droplet 10 remains "stuck" to major surface 122 and major surface 132 due to the pinning between contact lines 190, 192 and major surfaces 122, 132, respectively. At this point in the cycle, the offset in the x-direction between contact lines 190, 192 has elongated the side surface 11 of droplet 10, and droplet 10 consequently has a higher surface energy than it had prior to the elongation of its side surface, i.e., when configured shown in FIG. 4A. The non-equilibrium configuration of droplet 10 shown in FIG. 4B generates a restoring force that pulls at contact lines 190, 192 pinned to major surfaces 122, 132, respectively. The magnitude of the restoring force depends on the elongation of side surface 11 and, hence, on the offset in the x-direction between the contact lines. The peak amplitude of the oscillatory sliding motion between first confining plate 120 and second confining plate 130 is chosen so that the restoring force resulting from the motion is sufficient to overcome the drag force pinning contact lines 190, 192 to major surfaces 122, 132, respectively. A restoring force sufficient to overcome the drag force is sufficient to unpin the contact lines from the major surfaces. Unpinning contact lines 190, 192 from major surfaces 122, 132 significantly reduces the drag force on droplet 10, and allows droplet 10 to move freely in response to the motive force applied to the droplet by the above-described EWOD mechanism.

Figure 5:
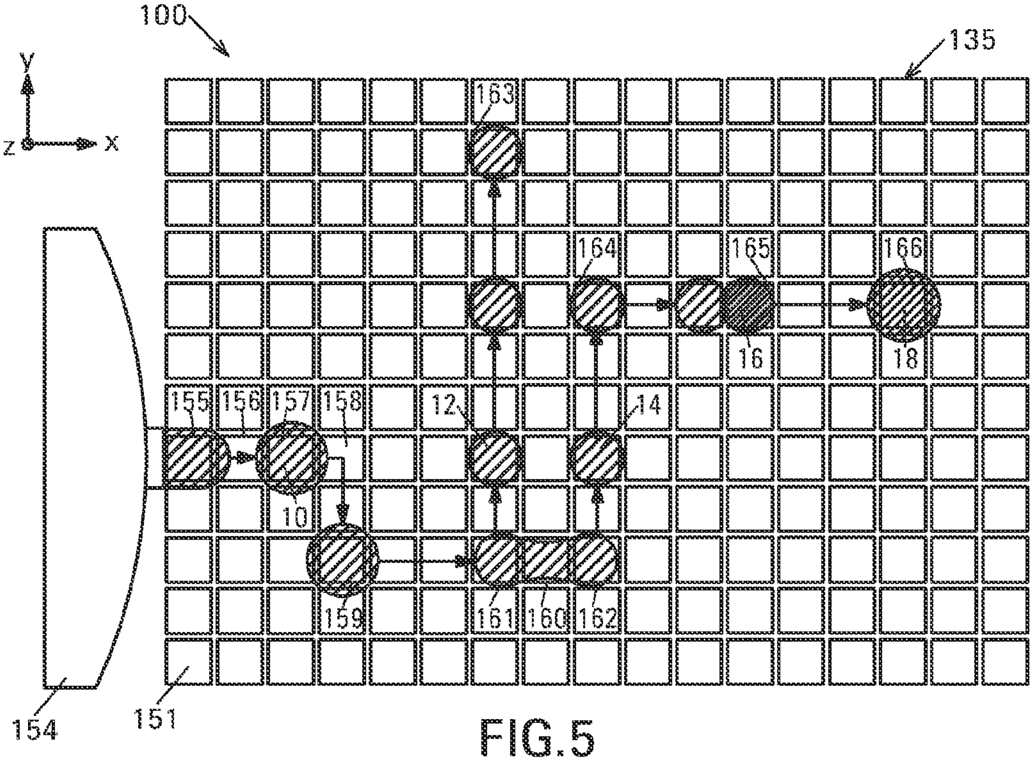
FIG. 5 is a schematic plan view showing some of the microfluidic operations that can be performed by an example of the DMF device shown in FIG. 3.

FIG. 5 is a schematic plan view showing some of the microfluidic operations that can be performed by an example of DMF device 100 in which actuator 110 (FIG. 3) imparts oscillatory sliding motion between confining plates 120, 130 to allow droplet 10 to move freely in the x-y plane relative to the major surfaces 122, 132 of confining plates 120, 130. For the purposes of illustration, first confining plate 120 and the hydrophobic layer 137 of second confining plate 130 of DMF device 100 are transparent. Additionally, actuator 110 is omitted to simplify the drawing. Referring additionally to FIG. 3, in DMF device 100, electrode array 135 on the surface of substrate 133 is a rectangular array of electrodes, an exemplary one of which is shown at 151. Reference numeral 151 will also be used to refer to the electrodes of electrode array 135 collectively. The rows of electrodes 151 define the x-direction and the columns of electrodes 151 define the y-direction, orthogonal to the x-direction in the plane of the major surface 132 of confining plate 130 in the above-described Cartesian coordinate system. Electrode array 135 is covered by hydrophobic layer 137 having major surface 132, as described above with reference to FIG. 3. In the following description, an electrode is said to be activated when driver circuit 180 momentarily applies a drive voltage between the electrode and common electrode 124 of first confining plate 120. The drive voltage applies a motive force to the droplet that moves the droplet towards the activated electrode. The example of DMF device 100 shown additionally includes a reservoir 154 that holds a liquid that constitutes droplet 10.

In the example shown in FIG. 5, an electrode 155 located adjacent reservoir 154 is activated to draw droplet 10 from the reservoir into the gap 128 between the major surface 122 of confining plate 120 and the major surface 132 of confining plate 130. Then, others of the electrodes 151 are sequentially activated to move droplet 10 in the gap 128 between major surfaces 122, 132, and/or to split droplet 10 into sub-droplets, and/or to merge droplet 10 or a sub-droplet thereof with another droplet.

In the example shown, the electrodes offset from one another in the x-direction between electrodes 155 and 158 are sequentially activated to move droplet 10 in the x-direction from electrode 155 to electrode 158. In this, electrodes 156, 157, and 158, offset from one another in the x-direction, are sequentially activated. Next, the electrodes offset from one another in the y-direction between electrodes 158 and 159 are sequentially activated to move droplet 10 in the y-direction to electrode 159. Next, the electrodes offset from one another in the x-direction between electrodes 159 and 160 are sequentially activated to move droplet 10 once more in the x-direction to electrode 160. When droplet 10 is located over electrode 160, electrodes 161 and 162, offset from electrode 160 in the −x-direction and the +x-direction, respectively, are activated simultaneously. The opposing motive forces applied to droplet 10 cause droplet 10 to elongate as shown, and then to split into two sub-droplets 12, 14 aligned with electrodes 161 and 162, respectively.

The electrodes offset from one another in the y-direction between electrodes 161 and 163 are then sequentially activated to move sub-droplet 12 in the y-direction to electrode 163. In an example, located at electrode 163 is an assay station (not shown) where an assay is performed on sub-droplet 12. Simultaneously or sequentially, the electrodes offset from one another in the y-direction between electrodes 162 and 164 are sequentially activated to move sub-droplet 14 in the y-direction to electrode 164. Electrode 164 is aligned in the x-direction with a droplet 16 located at an electrode 165. In an example, droplet 16 is a droplet of a reagent that has been extracted from another reservoir (not shown) located at an edge of electrode array 135 and that has been moved to electrode 165 by sequentially activating electrodes along a path that extends from the other reservoir to electrode 165. The electrodes offset from one another in the x-direction between electrode 164 and electrode 165 are then activated to move sub-droplet 14 in the x-direction into contact with droplet 16. Contact between sub-droplet 14 and droplet 16 causes sub-droplet 14 to merge with droplet 16 to form a merged droplet 18. In an example, a reaction takes place within the merged droplet. The electrodes offset from one another in the x-direction between electrodes 165 and 166 are then sequentially activated to move merged droplet 18 in the x-direction to electrode 166. In an example, located at electrode 166 is an assay station (not shown) where an assay is performed on the results of the reaction that took place when merged droplet 18 was formed.

Reservoirs similar to reservoir 154 and assay stations (not shown) can be located at multiple locations on and around electrode array 135. Imparting oscillatory sliding motion between confining plate 120 and confining plate 130 allows droplets to move freely in the x-y plane in the gap 128 between the major surfaces 122, 132 of the confining plates so that droplets from any reservoir can be merged with droplets from any other reservoir, and the resulting merged droplets can be moved to any assay station.

Defining a range of practical operational parameters for DMF device 100 involves an analysis of the dynamics of droplet 10 in the DMF device. Specifically, the surface tension-generated restoring force induced by shifting confining plate 120 in the x-y plane, e.g., the x-direction, relative to confining plate 130, and typical drag forces due to contact line pinning effects are estimated. From these estimates, a peak shift of confining plate 120 needed to overcome the drag force is estimated. Moreover, the frequency of the oscillatory sliding motion should remain below the resonant frequency of the droplet for the droplet to respond in phase to the oscillatory sliding motion between the confining plates. Thus, to define a maximum frequency of the oscillatory sliding motion, the mechanical resonant frequency of a typical droplet is estimated. Finally, some specific physical embodiments are described with exemplary operating parameters.

Figure 6:
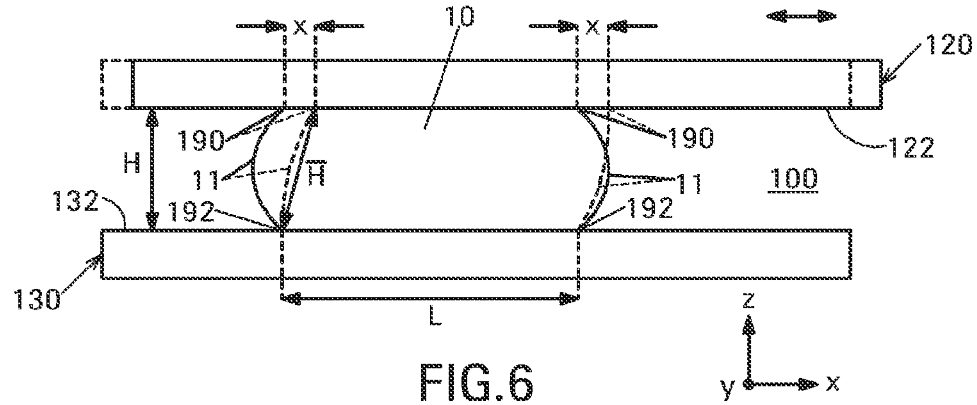
FIG. 6 is a schematic side view showing the portion of the DMF device shown in FIG. 3 in which a droplet is located and showing the deformation of the droplet that occurs when the triple-phase contact lines of the droplet are pinned to the major surfaces of the confining plates.

FIG. 6 is a schematic side view showing the portion of DMF device 100 in which droplet 10 is located and showing the deformation of droplet 10 that occurs when the triple-phase contact lines 190, 192 of the droplet are pinned to the major surfaces 122, 132 of confining plates 120, 130, respectively, as confining plate 120 is shifted a distance x relative to confining plate 130 in the x-y plane (the x-direction in the example shown), parallel to major surfaces 122, 132. As the shifting of confining plate 120 stretches droplet 10, the area of the side surface 11 of the droplet increases. The restoring force to which the droplet is subject can be estimated from the increased positive surface energy associated with the increased area of the side surface 11 of the droplet.

An estimation of the restoring force to which droplet 10 is subject as confining plate 120 is shifted in the x-direction from its unshifted position will now be described. The increase in area of the side surface 11 of droplet 10 due to confining plate 120 being shifted a distance x in the x direction from its non-shifted position can be estimated in the following way. In the following estimation, the curved side surface 11 of the droplet extending from contact line 190 at confining plate 120 to contact line 192 at confining plate 130 is approximated by a straight line extending between contact lines 190, 192.

In the unshifted position of confining plate 120, the length of the side surface 11 of droplet 10 is a minimum, and is approximately equal to the height H of the gap 128 between the major surface 122 of confining plate 120 and the major surface 132 of confining plate 130. The length of side surface 11 is the distance along side surface 11 from contact line 190 to contact line 192. As confining plate 120 is shifted a distance x from its unshifted position, the length of the side surface 11 of droplet 10 increases from minimum length H to a stretched length $\bar{H}$. Stretched length $\bar{H}$ is given by:

$$\bar{H} \cong (H^2+x^2)^{1/2}$$

where: x is the shift of confining plate 120 in the x-direction relative to its unshifted position, H is the minimum length of the side surface 11 of droplet 10 when confining plate 120 is in its unshifted position, and $\bar{H}$ is the stretched length of the side surface 11 of droplet 10 when confining plate 120 is shifted a distance x from its unshifted position.

When confining plate 120 is in its unshifted position, the projected surface area of droplet 10 in the y-z plane can be approximated as:

$$\text{Area}|_{unshifted} \cong 2HL$$

where L is the y-direction dimension of the contact patch between droplet 10 and major surface 132.

And when confining plate 120 is shifted a distance x from its unshifted position, the projected surface area of droplet 10 in the y-z plane can be approximated as:

$$\text{Area}|_{shifted} \cong 2\bar{H}L \cong 2(H^2+x^2)^{1/2}L.$$

The surface energy of droplet 10 is the product of the surface tension y and the surface area of the droplet.

When confining plate 120 is in its unshifted position, the surface energy of droplet 10 in the y-z plane can be approximated as:

$$\text{Energy}|_{unshifted} \approx 2HL\gamma.$$

And when confining plate 120 is shifted a distance x from its unshifted position, the surface energy of droplet 10 can be approximated as:

$$\text{Energy}|_{shifted} \approx 2(H^2+x^2)^{1/2}L\gamma.$$

Using the principle of virtual work, the restoring force $F_x$ is given by the gradient of the surface energy in the x-direction:

$$F_x = -\frac{\partial}{\partial x}(\text{Energy}) = -\frac{2x}{(H^2+x^2)^{1/2}}L\gamma.$$

Thus, the restoring force generated by shifting confining plate 120 a distance x from its unshifted position can be estimated in terms of the height H in the z-direction of gap

128 between the major surface 122 of first confining plate 120 and the major surface 132 of second confining plate 130, the width of the contact patch between droplet 10 and major surface 132, and the surface tension y of droplet 10.

An estimation of the drag force to which droplet 10 is subject will now be described. The contact angle for a droplet sitting on a flat surface is defined as the angle between the flat surface and a tangent to the surface of the droplet near the intersection of the droplet surface and the flat surface. For a stationary droplet in equilibrium, the contact angle is the same all around the perimeter of the droplet. However, when the droplet is dragged across the surface, as occurs when first confining plate 120 is shifted in the x-direction relative to second confining plate 130, and contact lines 190, 192 remain pinned to major surfaces 122, 132, respectively, the contact angle near the leading edge of the droplet increases and the contact angle near the trailing edge of the droplet decreases. When first confining plate 120 is shifted in the x-direction relative to second confining plate 130, the leading edge of droplet 10 is offset in the x-direction from the trailing edge of the droplet. These changes are due to the contact line catching on inhomogeneities in the surface, which is the origin of the hydrodynamic drag force. The drag force can be estimated by estimating the contact angle near the leading edge and the contact angle near the trailing edge. The contact angle at the leading edge will be referred to herein as the advancing angle, and the contact angle at the trailing edge will be referred to herein as the receding angle. Specifically, the vector surface tension forces are mismatched between the leading edge and the trailing edge of the droplet, and the corresponding drag force $F_{drag}$ can be estimated as:

$$F_{drag} \cong L\gamma(\cos(\theta_R) - \cos(\theta_A)),$$

where $\theta_R$ is the receding angle and $\theta_A$ is the advancing angle.

Measurements on a typical polytetrafluoroethylene (PTFE) surface (Abdelgawad et al, JAP 105, 094506 (2009)) yield $\theta_A \approx 116.5°$ and $\theta_R \approx 93.5°$. Thus, for a 1 mm-diameter water droplet ($\gamma \approx 0.07$ kg ms$^{-2}$), the drag force on a PTFE surface is approximately:

$$F_{drag} \approx 2.7 \times 10^{-5} \text{ kg m s}^{-2}.$$

The above estimates allow an estimate of the minimum shift of the first confining plate 120 of DMF device 100 needed to generate a restoring force $F_x$ sufficient to overcome drag force $F_{drag}$, and thus prevent sticking. As noted above, restoring force $F_x$ due to a shift of first confining plate 120 of a distance x from its unshifted position is given by:

$$F_x = -\frac{2x}{(H^2 + x^2)^{1/2}} L\gamma$$

$$\cong -\frac{2x}{H} L\gamma \text{ for } H \gg x.$$

Also as noted above, drag force $F_{drag}$ is given by:

$$F_{drag} \cong = L\gamma(\cos(\theta_R) - \cos(\theta_A)).$$

Therefore, to generate a restoring force equal to the drag force:

$$\frac{2x}{H} \cong (\cos(\theta_R) - \cos(\theta_A)).$$

For a droplet of water on a PTFE surface, x≈0.19H. Consequently, for a typical embodiment of DMF device 100 in which H≈100 μm, a shift in the position of first confining plate 120 from its unshifted position of more than about 20 μm will generate a restoring force sufficient to overcome the drag force. For an approximately sinusoidal oscillatory sliding motion, an RMS amplitude greater than about 15 μm will generate a restoring force sufficient to overcome the drag force.

The above estimation provides an indication of the peak spatial amplitude of the oscillatory sliding motion needed to generate a restoring force sufficient to overcome the drag force due to microscopic inhomogeneities in major surfaces 122, 132. However, the restoring force generated by oscillatory sliding motion having a peak amplitude less than that just estimated may reduce the drag force sufficiently to allow the droplet to respond reliably to the motive force generated by the EWOD mechanism. In some examples, a peak spatial amplitude equal to one-tenth of the width of gap 128 may achieve this result. Alternatively, when the droplet is subject to additional drag forces, such as those generated by macroscopic irregularities in the hydrophobic surfaces and/or chemical residues left on the hydrophobic surfaces from prior movements of the droplet or other droplets in the DMF device, oscillatory sliding motion with a larger peak spatial amplitude may be required to generate a restoring force of sufficient magnitude. Such a peak spatial amplitude would rarely need to be greater than the width H of gap 128. To minimize the energy consumption of actuator 110, the minimum peak spatial amplitude at which the droplet responds reliably to the EWOD mechanism is determined, and oscillatory sliding motion with a peak spatial amplitude that exceeds the minimum peak spatial amplitude by a prudent safety margin is used.

An estimation of the maximum frequency of the oscillatory sliding motion will now be described. To enable the oscillatory sliding motion of confining plate 120 of DMF device 100 to generate the restoring force needed to overcome the drag force, the droplet should respond in phase to the oscillatory sliding motion of major surface 122. To meet this condition, the oscillatory sliding motion should be slower than the mechanical response time of the droplet so that effects of the droplet's inertia will be negligible. This criterion is met when the frequency of the oscillatory sliding motion of confining plate 120 is lower than the resonant frequency of the mechanical oscillation of droplet 10. To estimate the mechanical resonant frequency of droplet 10, the equation of motion of the center-of-mass of the droplet in response to the restoring force as the portion of the droplet in contact with confining plate 120 is subject to the oscillatory sliding motion is calculated.

Figure 7:
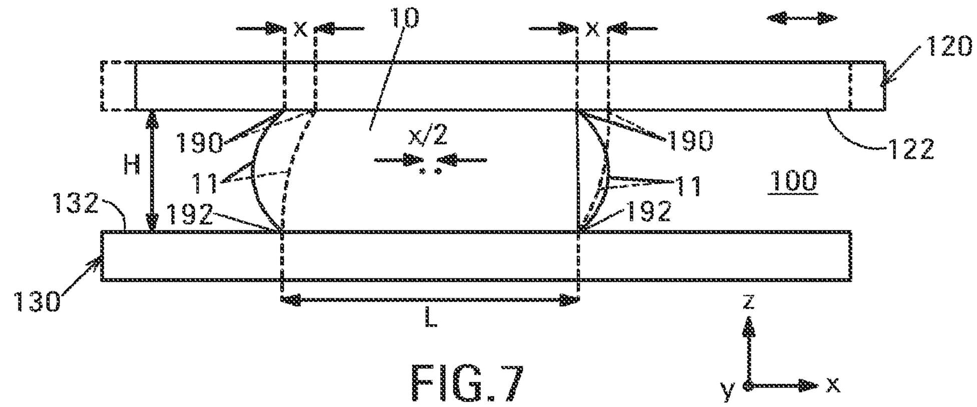
FIG. 7 is a schematic side view showing the portion of the DMF device shown in FIG. 3 in which a droplet is located and showing the response of the center of mass of the droplet to the oscillatory sliding motion of one of the confining plates.

FIG. 7 is a schematic side view showing the portion of DMF device 100 in which droplet 10 is located and showing the response of the center of mass of the droplet to the oscillatory sliding motion of confining plate 120. The product of the mass of the droplet and the acceleration of the center of mass of the droplet is equal to the restoring force, i.e.:

$$\left(\pi\left(\frac{L}{2}\right)^2 H\rho_{drop}\right)\left(\frac{\ddot{x}}{2}\right) = -\frac{2x}{(H^2 + x^2)^{1/2}} L\gamma \cong -\frac{2x}{H} L\gamma$$

where dots over the variables denote time-derivatives and $\rho_{drop}$ is the mass density of droplet 10. Thus:

$$\ddot{x} = -\left(\frac{16\gamma}{\pi L H^2 \rho_{drop}}\right)x$$

and the resonant frequency $\omega_0$ of the mechanical oscillation of droplet 10 is given by:

$$\omega_0 = \left(\frac{16\gamma}{\pi L H^2 \rho_{drop}}\right)^{1/2}.$$

Using the parameters specified above, and using $\rho_{drop}=10^3$ kg $m^{-3}$ (density of water), the mechanical resonant frequency of a droplet of water in DMF device 100 is roughly 950 Hz. Therefore, the frequency of the oscillatory sliding motion of confining plate 120 of DMF device 100 should be less than about 1 kHz for the above quasistatic analysis to be appropriate.

The above estimations are described with reference to an example in which first confining plate 120 is shifted in a direction parallel to the major surface 132 of second confining plate 130. However the above estimations are also applicable to an example in which second confining plate 130 is shifted in a direction parallel to the major surface 122 of first confining plate 120, and to an example in which first confining plate 120 is shifted in a direction parallel to the major surface 132 of second confining plate 130 and second confining plate 130 is simultaneously shifted in the opposite direction parallel to the major surface 122 of first confining plate 120.

As described above, by imposing relative oscillatory sliding motion between the confining plates 120, 130 of DMF device 100 that satisfies the amplitude and frequency conditions described above, the restoring forces generated by the oscillatory sliding motion between the confining plates cause the contact lines of the droplet to de-pin from the respective major surfaces. This substantially reduces drag forces to which the droplet is subject during droplet motion.

For a typical DMF device 100 in which the width of the gap 128 between major surfaces 122, 132 is approximately 100 μm and in which droplet 10 has a nominal diameter of 1 mm, actuator 110 should be able to impart an oscillatory sliding motion between confining plates 120, 130 with a spatial amplitude of greater than 20 μm, at a frequency in a range between about 100 Hz and the above-described mechanical resonant frequency of the droplet. The lower frequency of the range reflects the fact that the frequency of the oscillatory sliding motion should be substantially higher than the clock frequency of the activation pulses applied to the electrodes 151 of an electrode array 135. The clock frequency defines the rate at which electrodes 151 are sequentially activated. In current designs, the clock frequency is approximately 10 Hz. In future systems that use a higher clock frequency, the minimum frequency of the range should be raised proportionately.

The frequency of the oscillatory sliding motion can be greater than the above-described mechanical resonant frequency of the droplet (e.g., 950 Hz). However, if this is done, because of the inability of the whole droplet to respond to a frequency higher than the mechanical resonant frequency, the contact line de-pinning and attendant drag reduction will only occur at the major surface being moved. Thus, it is advantageous, but not required, that the frequency of the oscillatory sliding motion be less than the mechanical resonant frequency of the droplet.

In an example, referring again to FIG. 3, with actuator 110 turned off, a droplet 10 was installed in an example of DMF device 100 over an exemplary electrode 170 of electrode array 135. A drive voltage equal to the nominal operating voltage of DMF device 100 was applied to an electrode 172, next to electrode 160, but sticking between droplet 10 and major surfaces 122, 132 prevented the application of the nominal drive voltage from moving the droplet from over electrode 170 to over electrode 172. In an attempt to move the droplet, the drive voltage applied to electrode 172 was gradually increased beyond the nominal drive voltage, but arcing between electrode 172 and the surrounding electrodes occurred without droplet 10 moving. The drive voltage was reduced to zero, and actuator 110 was then turned on to impart oscillatory sliding motion between confining plate 120 and confining plate 130. The frequency and amplitude of the oscillatory sliding motion were in compliance with the parameters estimated above. The nominal drive voltage was reapplied to electrode 172, and droplet 10 immediately moved from over electrode 170 to over electrode 172.

Thus, with actuator 110 operating to impart oscillatory sliding motion between confining plate 120 and confining plate 130, voltages sequentially applied between common electrode 124 and selected ones of the electrodes 151 of electrode array 135 will move droplet 10 across major surfaces 122, 132 in a manner similar to that described above with reference to FIG. 5 and with a substantially reduced incidence of sticking.

Figure 8:
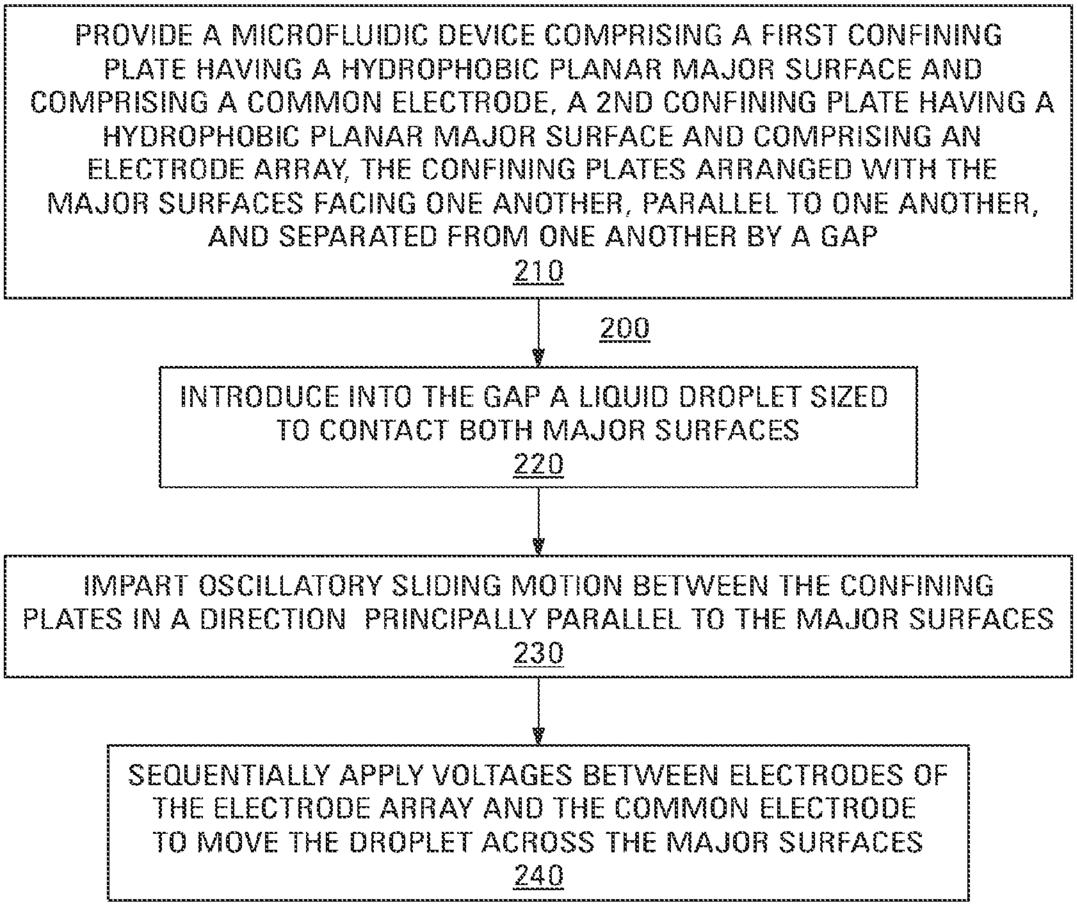
FIG. 8 is a flow chart showing an example of a microfluidic method, as disclosed herein.

FIG. 8 is a flow chart showing an example 200 of a microfluidic method, as disclosed herein. In block 210, a microfluidic device is provided. The microfluidic device comprises a first confining plate, and a second confining plate. The first confining plate has a hydrophobic planar major surface and comprises a common electrode. The second confining plate has a hydrophobic planar major surface and comprises an electrode array. The confining plates are arranged with the major surfaces facing one another, parallel to one another, and separated from one another by a gap. In block 220, a liquid droplet sized to contact both major surfaces is introduced into the gap. In block 230, oscillatory sliding motion is imparted between the confining plates in a direction principally parallel to the major surfaces. In block 240, voltages are sequentially applied between the electrodes of the electrode array and the common electrode to move the droplet across the major surfaces.

In an embodiment, the gap has a gap width; and the oscillatory sliding motion is imparted with a spatial amplitude, relative to the gap width, sufficient to overcome a drag force between the droplet and the major surfaces.

In an embodiment, the oscillatory sliding motion has a peak spatial amplitude greater than one-fifth of the gap width. In another embodiment, the oscillatory sliding motion has a peak spatial amplitude in a range from one-tenth of the gap width to equal to the gap width.

In an embodiment, the voltages are applied to the electrodes of the electrode array at a rate defined by a clock frequency; and the oscillatory sliding motion is imparted at a frequency greater than the clock frequency.

In an embodiment, the droplet has a mechanical resonant frequency in the direction parallel to the major surfaces; and the oscillatory sliding motion is imparted at a frequency less than the mechanical resonant frequency of the droplet. In another embodiment, the oscillatory sliding motion is imparted at a frequency greater than or equal to the mechanical resonant frequency of the droplet. However, in this case, the oscillatory sliding motion unsticks only the contact line between the droplet and the confining plate on which the oscillatory sliding motion is imparted.

This disclosure describes the invention in detail using illustrative embodiments. However, the invention defined by the appended claims is not limited to the precise embodiments described.

We claim:

1. A droplet-based microfluidic device, comprising:

a first confining plate comprising a first substrate, a first hydrophobic layer having a planar major surface, and a common electrode between the first hydrophobic layer and the first substrate;

a second confining plate comprising a second substrate, a second hydrophobic layer having a planar major surface, and an electrode array between the second hydrophobic layer and the second substrate, the first confining plate and the second confining plate disposed opposite one another with the major surfaces separated from one another by a gap;

at least one of the confining plates configured to be in contact with a droplet disposed between the confining plates; and an actuator configured to move the at least one of the confining plates in contact with the droplet to impart oscillatory sliding motion between the confining plates in a direction principally parallel to the major surfaces and thereby affect the droplet, wherein the gap is to accommodate a microfluidic droplet sized to contact both of the major surfaces, the microfluidic device additionally comprises a driver circuit to apply voltages between the common electrode and electrodes of the electrode array to move the droplet in defined directions across the major surfaces, the gap has a gap width, and the actuator is to impart the oscillatory sliding motion with a spatial amplitude sufficient to at least partially overcome a drag force between the droplet and the major surfaces.

2. The microfluidic device of claim 1, wherein the oscillatory sliding motion has a peak spatial amplitude greater than one-fifth of the gap width.

3. The microfluidic device of claim 1, wherein the oscillatory sliding motion has a peak spatial amplitude in a range from one-tenth of the gap width to equal to the gap width.

4. The microfluidic device of claim 1, wherein:

the voltages between the common electrode and electrodes of the electrode array apply a motive force to the droplet;

surface tension of the droplet generates a restoring force from the oscillatory sliding motion between the confining plates; and the oscillatory sliding motion has a spatial amplitude that generates the restoring force with a magnitude sufficient to reduce the drag force between the droplet and the major surfaces of the confining plates to less than the motive force.

5. The microfluidic device of claim 1, wherein:

the driver circuit is to apply the voltages to the electrodes at a rate defined by a clock frequency; and the actuator is to impart the oscillatory sliding motion at a frequency greater than the clock frequency.

6. The microfluidic device of claim 1, wherein:

the droplet has a mechanical resonant frequency in the direction parallel to the major surfaces; and the actuator is to impart the oscillatory sliding motion at a frequency less than the mechanical resonant frequency of the droplet.

7. The microfluidic device of claim 1, wherein:

the droplet has a mechanical resonant frequency in the direction parallel to the major surfaces; and the actuator is to impart the oscillatory sliding motion at a frequency greater than or equal to the mechanical resonant frequency of the droplet.

8. The microfluidic device of claim 7, wherein:

the oscillatory sliding motion has a peak spatial amplitude greater than one-fifth of the gap width.

9. The microfluidic device of claim 7, wherein:

the oscillatory sliding motion has a peak spatial amplitude in a range from one-tenth of the gap width to equal to the gap width.

10. The microfluidic device of claim 1, wherein:

the driver circuit is to apply voltages between the common electrode and electrodes at a rate defined by a clock frequency; and the actuator is to impart the oscillatory sliding motion at a frequency greater than the clock frequency.

11. The microfluidic device of claim 1, wherein the first confining plate additionally comprises a dielectric layer between the first hydrophobic layer and the common electrode.

12. The microfluidic device of claim 1, wherein the second confining plate additionally comprises a dielectric layer between the second hydrophobic layer and the electrode array.

13. A microfluidic method, comprising:

providing a microfluidic device comprising a first confining plate having a hydrophobic planar major surface and comprising a common electrode, a second confining plate having a hydrophobic planar major surface and comprising an electrode array, the confining plates arranged with the major surfaces facing one another, parallel to one another, and separated from one another by a gap;

introducing into the gap a liquid droplet sized to contact both major surfaces;

moving at least one of the confining plates in direct contact with a droplet disposed between the confining plates to impart an oscillatory sliding motion between the confining plates in a direction principally parallel to the major surfaces and thereby affecting the droplet; and sequentially applying voltages between electrodes of the electrode array and the common electrode to move the droplet across the major surfaces, wherein the gap has a gap width; and the imparting comprises imparting the oscillatory sliding motion with an amplitude sufficient to at least partially overcome a drag force between the droplet and the major surfaces.

14. The microfluidic method of claim 13, wherein the imparting comprises imparting the oscillatory sliding motion with a peak spatial amplitude in which greater than one-fifth of the gap width.

15. The microfluidic method of claim 13, wherein the imparting comprises imparting the oscillatory sliding motion with a peak spatial amplitude in a range from one-tenth the gap width to equal to the gap width.

16. The microfluidic method of claim 13, wherein:
the applying comprises applying the voltages to the electrodes of the electrode array at a rate defined by a clock frequency; and
the imparting comprises imparting the oscillatory sliding motion at a frequency greater than the clock frequency.

17. The microfluidic method of claim 13, wherein:
the droplet has a mechanical resonant frequency in the direction parallel to the major surfaces; and
the imparting comprises imparting the oscillatory sliding motion at a frequency less than the mechanical resonant frequency of the droplet.

* * * * *